United States Patent [19]
Kita

[11] Patent Number: 5,093,798
[45] Date of Patent: Mar. 3, 1992

[54] IMAGE PROCESSING SYSTEM
[75] Inventor: Kouichi Kita, Tochigi, Japan
[73] Assignee: Kabushiki Kaisha Toshiba, Kawasaki, Japan
[21] Appl. No.: 533,276
[22] Filed: Jun. 4, 1990

Related U.S. Application Data
[63] Continuation of Ser. No. 364,545, Jun. 6, 1989, abandoned, which is a continuation of Ser. No. 904,642, Sep. 8, 1986, abandoned.

[30] Foreign Application Priority Data
Sep. 11, 1985 [JP] Japan .................................. 60-199522
[51] Int. Cl.⁵ .............................................. G06F 15/62
[52] U.S. Cl. .................................... 364/518; 340/734
[58] Field of Search ............... 364/521, 518; 340/720, 340/721, 734, 798; 358/342, 345, 347

[56] References Cited
U.S. PATENT DOCUMENTS

| | | | |
|---|---|---|---|
| 3,525,092 | 8/1970 | Neitzel | 364/521 X |
| 4,210,931 | 7/1980 | Bailey et al. | 358/342 |
| 4,238,803 | 12/1980 | Terao et al. | 358/347 X |
| 4,253,724 | 3/1981 | Minoura et al. | 358/347 X |
| 4,317,114 | 2/1982 | Walker | 340/734 X |
| 4,484,187 | 11/1984 | Brown et al. | 340/721 X |
| 4,517,667 | 5/1985 | Sprague | 358/347 X |
| 4,527,155 | 7/1985 | Yamaki et al. | 340/721 X |
| 4,528,636 | 7/1985 | Robinson, III | 364/521 |
| 4,587,621 | 5/1986 | DuVall | 364/521 X |
| 4,616,336 | 10/1986 | Robertson et al. | 364/521 X |
| 4,661,811 | 4/1987 | Gray et al. | 340/734 X |
| 4,684,935 | 8/1987 | Fujisaku et al. | 340/721 X |
| 4,704,699 | 11/1987 | Farina et al. | 340/720 X |
| 4,757,309 | 7/1988 | Bowater et al. | 340/734 X |

Primary Examiner—Heather R. Herndon
Assistant Examiner—Mark K. Zimmerman
Attorney, Agent, or Firm—Finnegan, Henderson, Farabow, Garrett, and Dunner

[57] ABSTRACT

An image processing system has a display memory which stores image data supplied to a monitor via a D/A converter in order to display the image data on a monitor as an image. Overlay data, which represents character or a graph concerning the image data and which is to be superposed on the image data, is stored in an overlay memory. The data of the display memory and the overlay memory is bit-converted and formatted by an image data processing circuit, is input in a digital imager, and is recorded on a recording film of the imager.

16 Claims, 5 Drawing Sheets

FIG. 3

| ADDRESS | RECORDING DATA | |
|---|---|---|
| 0 | 0 0 0 0 0 0 0 0 | BLACK LEVEL |
| 1 | 0 0 0 0 0 0 0 1 | |
| 2 | 0 0 0 0 0 0 1 0 | |
| 3 | 0 0 0 0 0 0 1 1 | |
| ⋮ | ⋮ | |
| 511 | 1 1 1 1 1 1 1 1 | WHITE LEVEL |

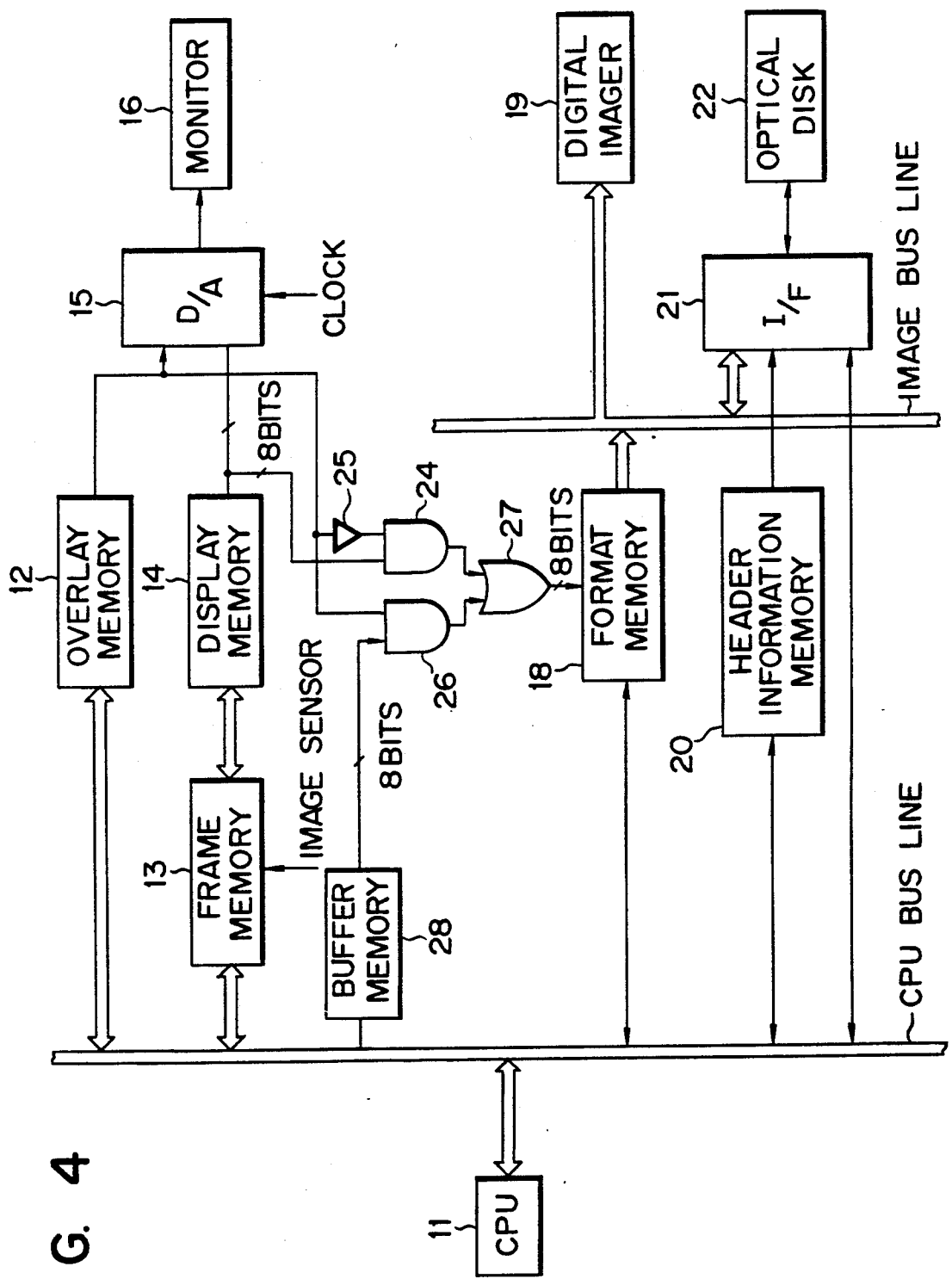
F I G. 4

IMAGE PROCESSING SYSTEM

This application is a continuation of application Ser. No. 07/364,545, filed June 6, 1989, which is a continuation of application Ser. No. 06/904,642, filed Sept. 8, 1986.

BACKGROUND OF THE INVENTION

The present invention relates to an image processing system and, more particularly, to an image processing system for use in displaying, storing and transmitting digital image data.

In conventional image processing systems, digital image data stored in a frame memory is written into a display memory. Character data or graph digital data is stored in an overlay memory. The data in the display and overlay memories is input to a monitor via a D/A converter, and an image and associated characters or graphs are displayed on the monitor. The image, character, and graph data are input in a video imager via a video output terminal, and are recorded on a film of the video imager.

With conventional image processing systems as described above, when the image, character, and graph data are recorded on the film by the video imager, the data supplied via the D/A converter are used. In this case, video signals must be input to the video imager in correspondence with the scanning line of the monitor. For this purpose, when a plurality of monitors having different scanning speeds are used, a plurality of imagers corresponding to the different scanning speeds must be connected to the respective monitors.

When image data is stored in a digital memory unit such as an optical disk, the image data must be input to the digital memory unit via a CPU bus line. Therefore, the CPU must execute a complicated program. More specifically, the contents and file numbers of the images currently displayed are sequentially checked, additional data (overlay data such as character data or graph data) relative to a file number selected thereby is read from a magnetic disk, and the image data corresponding to the selected file number is read from the magnetic disk. The data read from the magnetic disk is processed to correspond to the file number.

SUMMARY OF THE INVENTION

It is an object of the present invention to provide an image processing system wherein the processing speed is increased and demands on the software and the CPU are decreased when an image is displayed and stored simultaneously.

According to the present invention, there are provided a processing means for bit-converting and formatting the data from an overlay memory and a display memory, and a memory for storing processing data obtained by the processing means. The data in the memory is input in a digital memory unit or digital display unit and is recorded in a recording medium or displayed.

BRIEF DESCRIPTION OF THE DRAWINGS

FIG. 3 is a look-up table stored in the look-up table memory shown in FIG. 1 which includes addresses and 8-bit image data corresponding to each address; and FIG. 4 is a block diagram of an image data processing system according to another embodiment of the invention.

DETAILED DESCRIPTION OF THE PREFERRED EMBODIMENTS

Figure 1:
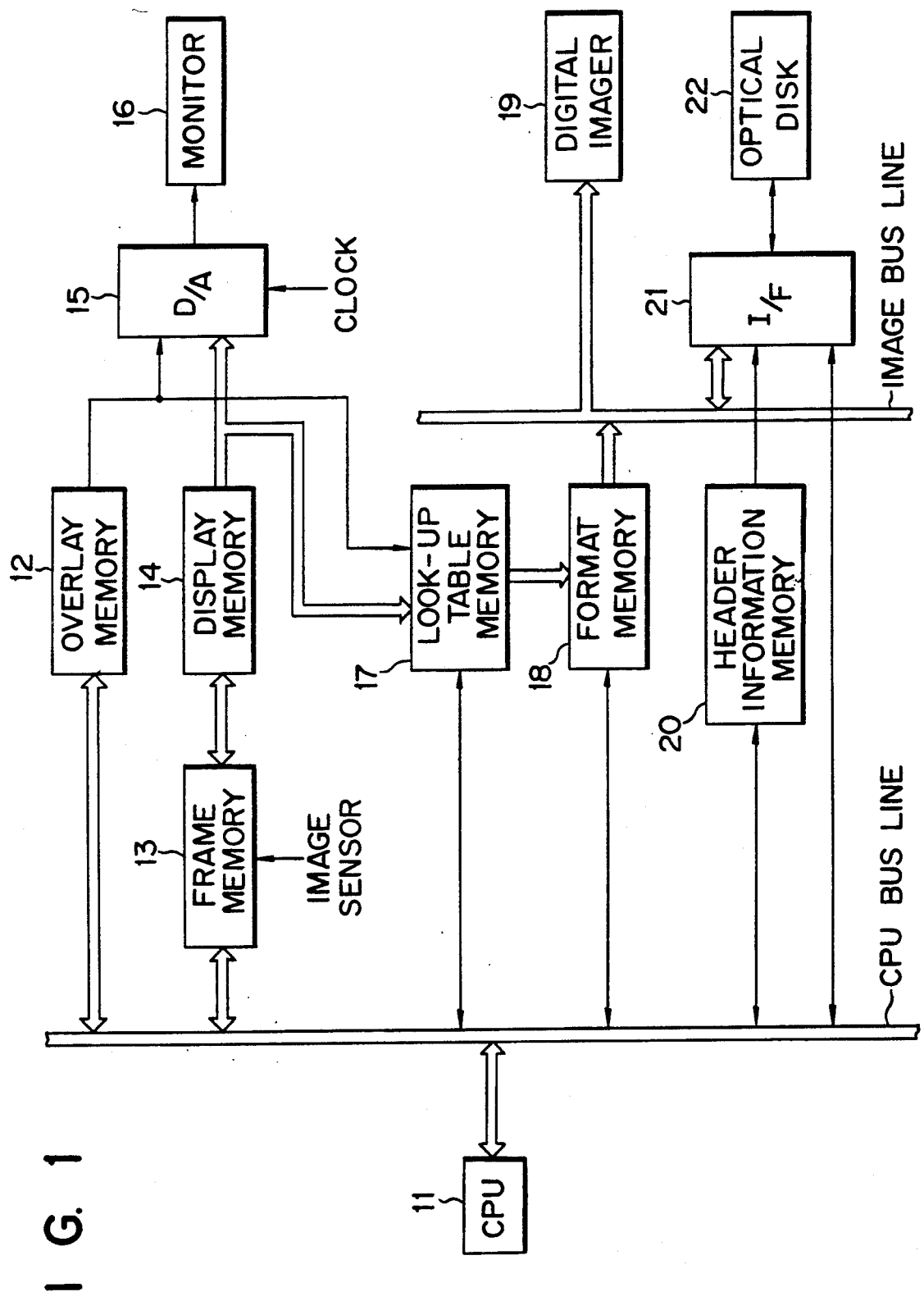
FIG. 1 is a block diagram of an image data processing system according to an embodiment of the present invention.

Referring to FIG. 1, CPU 11 for controlling the overall system is connected to overlay memory 12 and frame memory 13 by a bus. Memory 13 stores image data output from an image sensor, and memory 12 stores character and graph data related to the image data. The output terminal of memory 13 is connected to display memory 14. The readout terminals of memories 12 and 14 are connected to D/A converter 15 and also to look-up table memory 17.

Memory 17 comprises a memory the contents of which are accessed by an n-bit, e.g., a 9-bit, address. Each address is obtained by combining an 8-bit image data from memory 14 with a one-bit data from the overlay memory 12. Memory 17 outputs m-bit, e.g., 8-bit, image data. The output terminal of memory 17 is connected to format memory 18.

Memory 18 has a memory area which can store image data of one or a plurality of frames, e.g., 3×3=9 frames, and stores image data obtained from memory 17. The output terminal of memory 18 is connected via an image bus to digital imager 19. The output terminal of memory 18 is also connected via the image bus to optical disk device 22 via interface (I/F) 21.

Header information corresponding to or representing the attribute of the image to be stored is supplied from CPU 11 to header information memory 20 via the CPU bus. Memory 20 is connected to optical disk device 22 via interface 21.

Figure 2A:
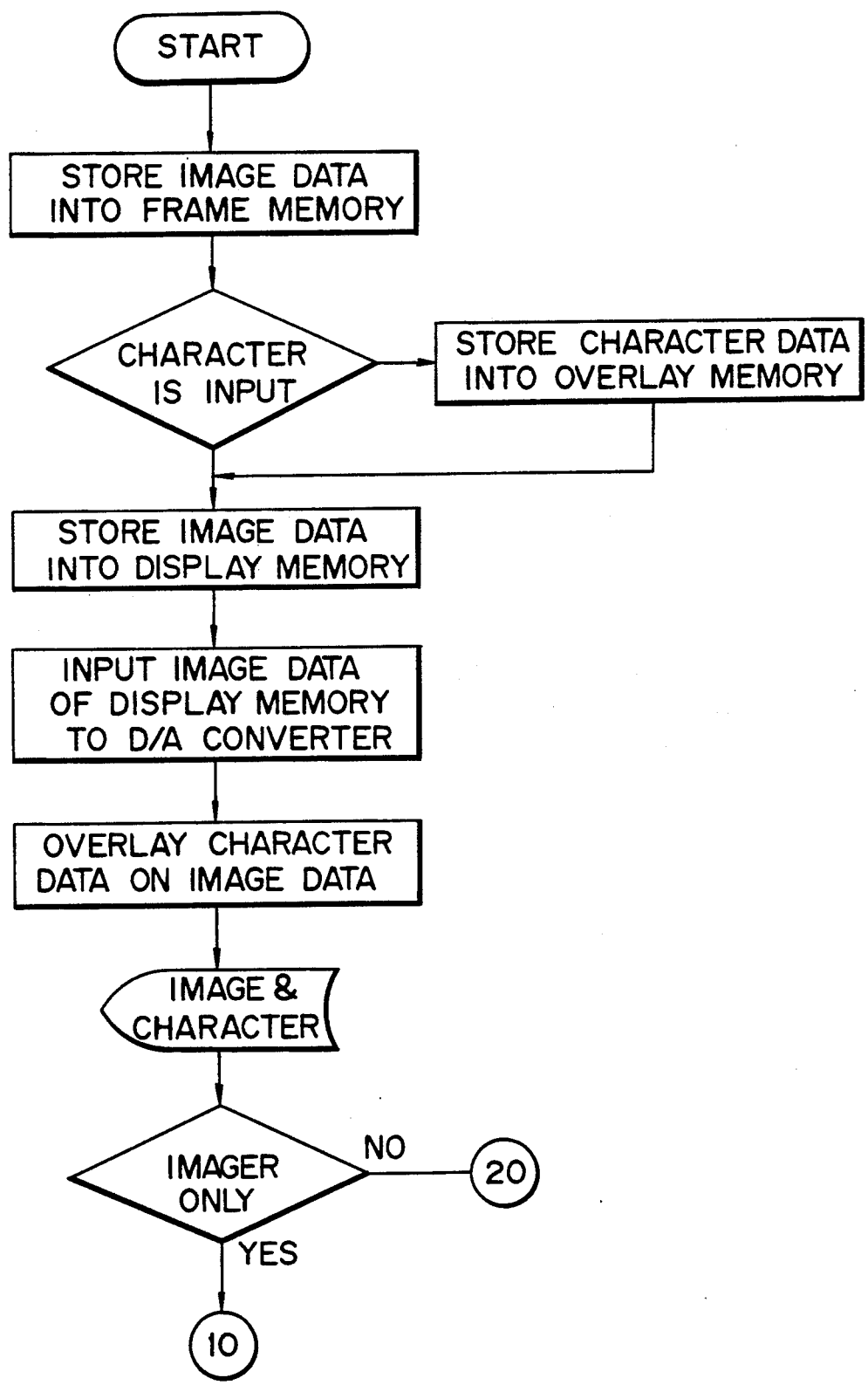
FIGS. 2A and 2B are flow charts for explaining the operation of the image processing system shown in FIG. 1.
Figure 2B:
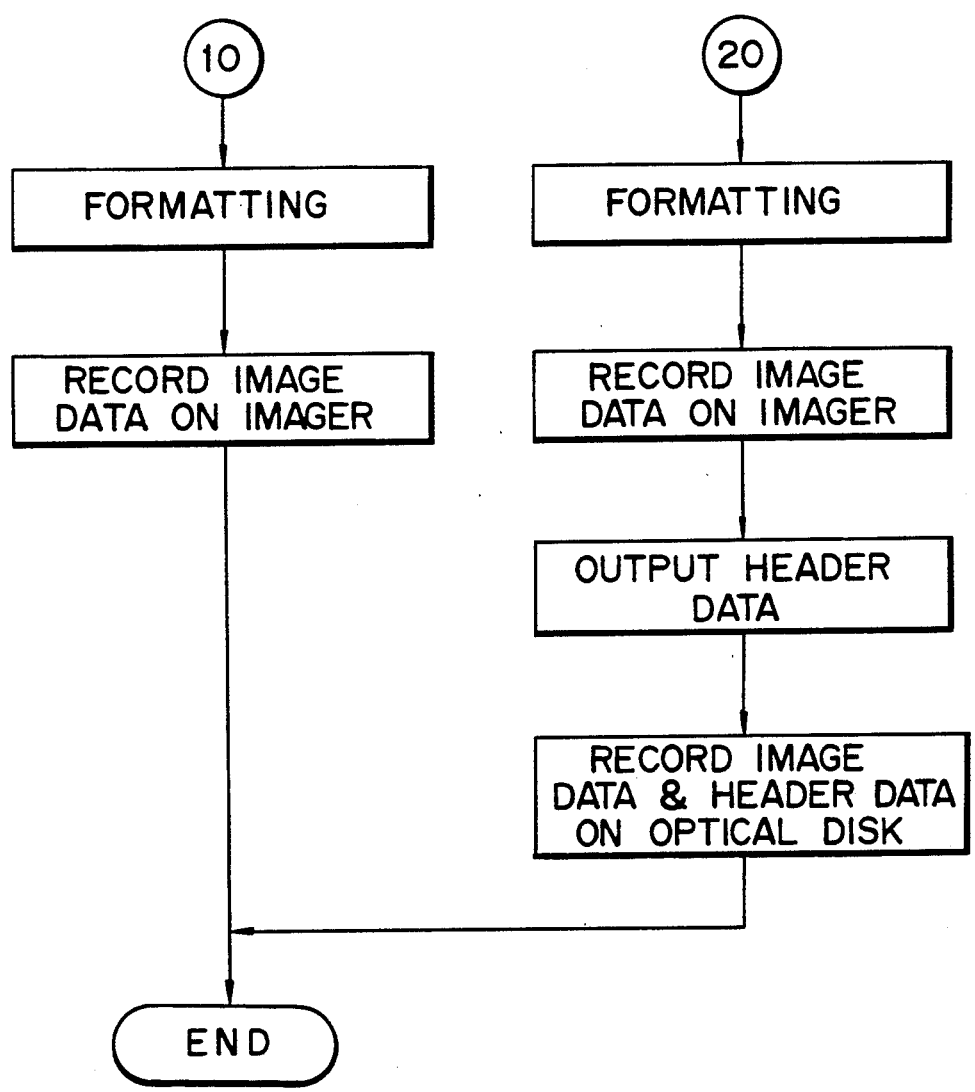

The operation of the system shown in FIG. 1 will now be described with reference to the flow charts of FIGS. 2A and 2B. In response to a start command, CPU 11 causes memory 13 to store image data supplied from an image sensor. When one frame of image data is stored in memory 13, CPU 11 checks for the presence or absence of character data (e.g., name of the patient, the ID number, or acquisition conditions) or graph data related to the stored image data. When the character data is input, it is stored in overlay memory 12.

The image data in memory 13 is transferred to display memory 14 and is stored therein. Memory 14 stores 8-bit image data representing gray levels of respective pixels.

The image data stored in memory 14 is input to D/A converter 15 together with the character data from memory 12. Converter 15 converts the image data into an analog video signal in response to a clock. The analog video signal is input to monitor 16 and is displayed as an image.

While display device 16 displays an image, when CPU 11 receives a command to record the displayed image only in digital imager 19, it supplies an image data forming command to memories 17 and 18. In response to the forming command, memory 17 initially bit-converts the image data supplied from memory 14. More specifically, memory 17 contains a prestored look-up table which has 9-bit address data obtained by the image data representing white to black levels in memory 14 and overlay data. The look-up table also has addresses 0 to 511, and 8-bit image data corresponding to each address. When 8-bit image data and one-bit overlay data are input from overlay memory 12 and memory 14 to memory 17, 8-bit image data corresponding to the image of a gray level represented by the input 9-bit data is read from the look-up table. When overlay data is present, the most significant bit of the 9-bit data word is "1", i.e., the most significant bit represents as address higher than 256. A corresponding 8-bit data word such as "11111111" is then read out from memory 17. The 8-bit image data is stored at a predetermined address of memory 18. In this case, the image data is written in memory 18 in synchronism with the clock input to D/A converter 15. In this manner, the correspondence between the scan line of monitor 16 and the address of memory 18 is maintained.

When image data is written into memory 18, it can be processed in a conventional manner to enlarge or reduce the image. For example, to enlarge the image, the image data read from the look-up table would be interpolated by conventional interpolation circuitry and stored in memory 18 as enlarged image data. To reduce the image in size, the image data read out from the look-up table would be sampled by conventional sampling circuitry and stored in memory 18 as reduced image data. The circuit for performing interpolation and sampling can be additionally provided in memory 17.

As described above, since memory 18 has a memory capacity capable of storing 9-frame image data, it can store image data of 9(3 rows × 3 columns) frames. When the 9-frame image data is read out collectively, e.g., as a single enlarged frame, image data which can display 9 images on a single frame at once can be formed in memory 18.

The image data stored in memory 18 is input to digital imager 19 via the image bus, and is recorded by imager 19. Imager 19 comprises a laser system for modulating a laser beam according to the image data read out from memory 18, and an exposure unit for optically recording the image data of memory 18 on a film by means of the modulated laser beam from the laser.

In formatting, when character or graph overlay data is input from overlay memory 12 to look-up table memory 17, this data is indicated only by black and white levels. Therefore, address 0 (black) or 511 (white) of memory 17 is designated, although the gray-scale image data has been supplied from memory 14. The character or graph overlay data is thus superposed on the image data, and stored in memory 18 and imager 19.

When the image data is recorded in optical disk 22 in addition to in imager 19, it is input to optical disk device 22 as well as imager 19. The image data is input to device 22 from format memory 18 via the image bus and interface 21. In this case, the header information stored in memory 20 is input to device 22 via interface 21, and is recorded in the head portion of a track for storing the image data.

When the image data is to be recorded in optical disk device 22, if the overlay data in overlay memory 12 is not to be recorded in device 22, CPU 11 prohibits the overlay data to be recorded in memory 18.

As described above, according to the present invention, a processing circuit means, e.g., look-up table memory 17 and format memory 18, for performing bit conversion and formatting is provided between a display memory means, e.g., overlay memory 12 and display memory 14, and a digital file device, e.g., digital imager 19 and optical disk device 22. Therefore, image data can be processed so as to be recorded in the digital file device by means of the processing circuit means. The demand on CPU 11 can thus be decreased to a considerable degree, the image data processing speed can be increased, and the operability of CPU 11 can also be improved. In addition, since the image data is stored in format memory 18 precisely in synchronism with the scan line of the monitor, a high quality image can be recorded upon reception of image data from format memory 18 even when only a single digital imager is provided.

According to the embodiment shown in FIG. 4, the overlay memory 12 is connected to one input terminal of AND gate 24 through inverter 25 and to one input terminal of AND gate 26. The display memory 14 is connected to the other terminal of AND gate 24. The other terminal of AND gate 26 is connected to buffer memory 28, which stores a constant value (e.g., 11111111 or 00000000) through an 8-bit line. The output terminals of AND gates 24 and 26 are connected to format memory 18 through, OR gate 27.

In the embodiment of FIG. 4, when the pixel value of overlay memory 12 is "1", the constant value of the buffer memory 28 is input to OR gate 27. If the pixel value of overlay memory 12 is "0", the image data of display memory 14 is input to OR gate 27. That is, the constant value of the image data is selected in accordance with the pixel value of the overlay memory 12.

In the embodiments described above, when format memory 18 stores the image data corresponding to one frame of monitor 16, the image data may be read out and supplied to digital imager 19 to overlay the overlay data on the image data therein.

The overlain data is not only stored in digital imager 19 and/or optical disk 22 but also can be transmitted to another network to be displayed on another display unit and/or to be recorded on another digital file device. If a plurality of overlay memories are used, address data of the look-up table must consist of more than nine bits.

What is claimed is:

1. An image processing system for recording image data and corresponding overlay data to a digital recording device, said system comprising:

first storage means for storing the image data;
   second storage means for storing the overlay data; and
   converting means operatively coupled to said first and said second storage means and to the digital recording device for prestoring a plurality of image hue values corresponding to the image data and an overlay value corresponding to the overlay data, and for outputting to the digital recording device the overlay value when the overlay data assumes a first state and one of the image hue values when the overlay data assumes a second state different from the first state.

2. A system according to claim 1, wherein said converting means comprises a plurality of storage elements for storing respective ones of the overlay value and the image hue values, each of said storage elements being accessed by a respective and unique address.

3. A system according to claim 1, wherein:
   said first storage means comprises means for storing the image data as a plurality of pixel data, each of said pixel data comprising n-bit pixel data;
   said converting means converts the n-bit pixel data into m-bit image hue values, m being different from n; and said converting means includes third storage means for storing the m-bit image hue values.

4. A system according to claim 1, wherein said converting means further includes formatting means for formatting the outputted value.

5. A system according to claim 1, wherein said converting means includes a look-up table for prestoring the image hue values and the overlay value as a plurality of addresses.

6. An image processing system for digitally recording m-bit image data and corresponding one-bit digital overlay data to a digital recording device, said system comprising:
   first storage means for storing the image data in accordance with a pixel address;
   second storage means for storing the overlay data in according with the pixel address; and
   converting means operatively coupled to said first and said second storage means and to the digital recording device for alternatively outputting to the digital recording device one of the image data and a predetermined constant in accordance with the overlay data.

7. A system according to claim 6, wherein said converting means includes a look-up table for prestoring the image data and the predetermined constant.

8. A system according to claim 6, wherein said converting means includes gating means for gating the predetermined constant to the digital recording device when the corresponding overlay data is in a first state, and for gating the image data to the digital recording device when the corresponding overlay data is in a second state different from the first state.

9. A system according to claim 8, wherein said gating means includes:
   a first AND gate coupled to said second memory means;
   a second AND gate coupled to said first and said second memory means, and an inverter coupled between said second memory means and said second AND gate for inverting the overlay data from said second memory means; and
   an OR gate coupled to and receiving the output from said first and said second AND gates and operatively coupled to the digital recording device to output the one of the image data and the predetermined constant.

10. An image processing system for recording image data and corresponding overlay data to a digital recording device, said system comprising:
    first storage means for storing the image data;
    second storage means for storing the overlay data; and
    converting means operatively coupled to said first and said second storage means and to the digital recording device for outputting to the digital recording device a predetermined constant data when the overlay data is in a first state and the image data when the overlay data is in a second state different from the first state.

11. A system according to claim 10, wherein said converting means includes gating means for gating the predetermined constant to the digital recording device when the overlay data is in the first state, and for gating the image data to the digital recording device when the overlay data is in the second state.

12. A system according to claim 11, wherein said gating means includes:
    a first AND gate coupled to said second memory means;
    a second AND gate coupled to said first and said second memory means, and an inverter coupled between said second memory means and said second AND gate for inverting the overlay data from said second memory means; and
    an OR gate coupled to and receiving the output from said first and said second AND gates and operatively coupled to the digital recording device to output the one of the image data and the predetermined constant.

13. An image processing system for digitally storing image data overlain with digital overlay data including graphic character data, said system comprising:
    first storage means for storing m-bit image data;
    second storage means for storing one-bit overlay data for selected ones of the m-bit image data;
    bit-converting means, operatively coupled to the first and second storage means, for receiving said m-bit image data and said one-bit overlay data as (m+1)-bit data and producing an alternative one of said m-bit image data and an m-bit predetermined constant according to said one-bit overlay data;
    format memory means for storing the output of said bit-converting means; and
    digital recording means for digitally recording said output stored in said format memory means.

14. A system according to claim 13, wherein said bit converting means includes a look-up table which is accessed by the one-bit overlay data and the m-bit image data.

15. A system according to claim 14, wherein said bit-converting means outputs the constant when the overlay data is "1", and the image data when the overlay data is "0".

16. A system according to claim 13, wherein said bit converting means comprises a memory for storing the constant, and gate means for selectively gating the constant and the image data.

* * * * *

UNITED STATES PATENT AND TRADEMARK OFFICE
CERTIFICATE OF CORRECTION

PATENT NO. : 5,093,798
DATED : March 3, 1992
INVENTOR(S) : Kouichi Kita

It is certified that error appears in the above-indentified patent and that said Letters Patent is hereby corrected as shown below:

Abstract, line 5, change "character" to --characters--.

Claim 6, column 5, line 17, change "according" to --accordance--.

Signed and Sealed this

Twenty-sixth Day of October, 1993

Attest:

BRUCE LEHMAN

*Attesting Officer*      *Commissioner of Patents and Trademarks*